(12) United States Patent
Abrashkevich et al.

(10) Patent No.: US 7,181,585 B2
(45) Date of Patent: Feb. 20, 2007

(54) DEFENSIVE HEAP MEMORY MANAGEMENT

(75) Inventors: Alexander Abrashkevich, Toronto (CA); Mark F. Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/427,085

(22) Filed: Apr. 30, 2003

(65) Prior Publication Data

US 2004/0221120 A1    Nov. 4, 2004

(51) Int. Cl.
*G06F 12/00* (2006.01)
*G06F 13/00* (2006.01)

(52) U.S. Cl. .................. 711/170; 711/100; 711/154; 711/173

(58) Field of Classification Search ............... 711/100, 711/154, 170, 173
See application file for complete search history.

(56) References Cited

U.S. PATENT DOCUMENTS

| | | | |
|---|---|---|---|
| 5,247,634 A | 9/1993 | Cline et al. | |
| 5,404,511 A | 4/1995 | Notarianni | |
| 5,410,669 A * | 4/1995 | Biggs et al. | 711/118 |
| 5,561,786 A | 10/1996 | Morse | |
| 5,652,864 A | 7/1997 | Hine | |
| 5,680,582 A | 10/1997 | Slayden | |
| 5,737,516 A * | 4/1998 | Circello et al. | 714/38 |
| 5,742,793 A | 4/1998 | Sturges et al. | |
| 5,797,689 A | 8/1998 | Oyama et al. | |
| 5,809,554 A | 9/1998 | Benayon et al. | |
| 5,893,162 A | 4/1999 | Lau et al. | |
| 5,943,692 A | 8/1999 | Marberg et al. | |
| 5,964,893 A * | 10/1999 | Circello et al. | 714/39 |
| 5,974,528 A * | 10/1999 | Tsai et al. | 712/37 |
| 6,055,547 A | 4/2000 | Cooper et al. | |
| 6,088,777 A | 7/2000 | Sorber | |
| 6,175,900 B1 | 1/2001 | Forin et al. | |
| 6,256,642 B1 | 7/2001 | Krueger et al. | |
| 6,286,088 B1 | 9/2001 | Campbell et al. | |
| 6,732,311 B1 * | 5/2004 | Fischer et al. | 714/737 |
| 2004/0172513 A1 * | 9/2004 | Nelson | 711/170 |
| 2004/0186976 A1 * | 9/2004 | Bayt | 711/170 |
| 2004/0193775 A1 * | 9/2004 | Van Doren et al. | 711/1 |

* cited by examiner

*Primary Examiner*—Tuan V. Thai
(74) *Attorney, Agent, or Firm*—Gregory K. Goshorn; Mark S. Walker; Greg Goshorn, P.C.

(57) ABSTRACT

A data structure, method and system are provided incorporating a general purpose memory allocator and defensive heap memory manager. This provides an ability to reliably detect various types of memory errors, dynamically enable or disable memory debugging, enhance success of read and write operations using various memory verification techniques. Further, through separation of control information associated with allocated and free chunks of memory from the chunks themselves (separation of metadata from actual data), enhanced protection of vital information about the heap memory layout in general is provided. The heap memory manager uses read, write, and execute protected heap header walls and pool header walls and may, for each pool and memory block, separately use hidden front and back Memory Debug Information Areas (MDIAs) with checksums and well-known signature fields thereby enhancing overall memory management.

23 Claims, 9 Drawing Sheets

DEFENSIVE HEAP MEMORY MANAGEMENT

FIELD OF THE INVENTION

This invention relates generally to dynamic computer memory management, and more particularly to managing computer memory including detecting memory access errors and corruptions of storage heap data at run-time.

BACKGROUND OF THE PRESENT INVENTION

Existing computer systems may manage computer memory dynamically allowing more efficient utilization of available physical memory. Since exact memory requirements needed during execution of a program cannot usually be predicted prior to execution, most computer programs require dynamic memory handling. A dynamic memory manager handles computer memory requests for allocating, freeing, reallocating, deallocating, and defragmenting available memory space within a memory storage heap typically with a goal of performing these tasks as efficiently as possible. In this context, the term "storage heap" refers to a pool of memory used for dynamic memory allocations where arbitrary-sized blocks of memory used by a computer program for the temporary storage of data are allocated and freed in an arbitrary order at run time.

When a program needs a memory block for storing data, the program requests the memory block from a storage heap manager. The manager allocates a block of requested size from the heap and returns a handle or pointer to the block that is then typically used by the requesting program to access the block. When data stored in the block is no longer needed, the requesting program notifies the memory manager that the block can be freed. The manager frees the block of memory making it available again for allocation.

Typically a memory allocator should minimize memory fragmentation (inability to reuse memory that is free), allocation/deallocation time, locality of reference (reduction of page and cache misses), and have an adequate memory error detection mechanism. Typical allocator mechanisms for implementing various placement policies are sequential fit, segregated free lists, indexed fit, and bitmapped fit realized usually using linked lists, lookup tables or indexing tree data structures. In many of these methods each memory block contains hidden header fields with some additional control information (e.g., block size, boundary tags/flags (free/in use status), links to the left/right neighbors, etc.). When one of the memory blocks is corrupted, the whole memory data structure is usually corrupted as well, thus preventing further usage, causing an interruption of execution sequence and error exit. In many current dynamic memory manager implementations, control information about free and allocated blocks is distributed over the whole storage heap together with memory blocks and is not protected. Corruption of a single memory block or its control information can have a disastrous effect on the whole storage heap.

A memory manager may also be responsible for coalescing free blocks to reduce excessive fragmentation of memory resulting from multiple allocations/deallocations of memory blocks of different sizes. Coalescing is a process of combining smaller free blocks into larger free blocks for more efficient memory allocation. In many allocators, an immediate coalescing of a freed block with its left and/or right neighbor is implemented. This placement policy reduces external fragmentation improving memory utilization, avoids postponing work, providing more predictable speed, and improving stability. However, this policy requires a quick inexpensive check to determine whether two memory blocks can be coalesced and a capability of coalescing very fast. Many memory allocators that support general coalescing use boundary tags to implement the coalescing of free memory areas. Each block of memory usually has both header and a footer field containing the size of the block and information indicating whether it is in use. This policy can however lead to a corruption of the whole memory data structure (linked list, lookup table, indexed tree, etc.) if some element within is corrupted. In addition, data structures based on a linear sequential search (e.g., linked lists) are typically slow and therefore not used for managing large heaps. Indexed trees, on the other hand, can manage large heaps but in order to be more efficient frequent enforced rebalancing of a tree is required which is typically a complex (from implementation point of view) and expensive procedure. Hence, there is a need for a high performance, efficient memory allocation method that is both easy to implement and maintain.

SUMMARY OF THE PRESENT INVENTION

It is desirable to provide a general-purpose memory allocator having emphasis on efficiency, high level of safety and flexibility, built-in defensive features, and reliable memory error detection. The present invention for defensive dynamic memory management is directed toward the desirable result. Such a memory manager may be used in memory controllers, operating systems, programming language runtime libraries, software and database applications and tools, distributed computing, software applications requiring long standing monitoring of critical systems, and long-running networked server applications.

In accordance with one aspect of the invention, there is provided a method for allocating memory by memory manager of a data processing system, the method comprising allocating a primary allocation of memory and a primary data structure associated with the primary allocation of memory, the primary data structure containing attributes describing the primary allocation of memory. In addition, allocating a secondary allocation of memory associated with and pointed to by the primary allocation of memory, the secondary allocation of memory associated with a secondary data structure containing attributes describing the secondary allocation of memory. Further, allocating a tertiary allocation of memory associated with and pointed to by the secondary allocation of memory, the tertiary allocation of memory associated with a tertiary data structure containing attributes describing the tertiary allocation of memory.

In accordance with another aspect of the invention, there is provided a data processing system for allocating memory, the data processing system comprising means for allocating a primary allocation of memory and a primary data structure associated with the primary allocation of memory, the primary data structure containing attributes describing the primary allocation of memory. Further means for allocating a secondary allocation of memory associated with and pointed to by the primary allocation of memory, the secondary allocation of memory associated with a secondary data structure containing attributes describing the secondary allocation of memory. Additional means for allocating a tertiary allocation of memory associated with and pointed to by the secondary allocation of memory, the tertiary allocation of memory associated with a tertiary data structure containing attributes describing the tertiary allocation of memory.

In accordance with a further aspect of the invention, there is provided a computer program product having a computer readable medium tangibly embodying a computer executable program of instructions for directing a data processing system to implement the method of the invention.

In accordance with a further aspect of the invention, there is provided an article comprising a computer readable signal-bearing medium and means in the medium for implementing the method of the invention.

BRIEF DESCRIPTION OF THE DRAWINGS

Preferred embodiments of the invention will now be described, by way of example, with reference to the accompanying drawings, in which.

DETAILED DESCRIPTION OF THE INVENTION

In a preferred embodiment, there is provided a method, system and article for allocating memory by a memory manager of a data processing system, directed to defensive dynamic management of data memory. Emphasis is placed on efficient management of addressable computer memory, protection of heap control data structures and reliable detection, at run-time, of various forms of memory corruption. Within this context, a memory manager is described as being incorporated into an operating system of a conventional computer. However, a memory manager within the context of embodiments of the invention may also be suitable for managing other forms of memory, such as disk memory, and hence may be implemented as part of memory controllers of various memory units, programming language runtime libraries, and the like, in places other than general purpose computer. The present memory manager may also be used for shared memory heap management, such as managing memory that is shared between threads and/or processes. There are examples of heap memory management where 1) the size of a heap is usually limited by the size of a shared memory segment requested although some modern computers may allow changing the size of a shared memory management; 2) special care is required for synchronization of memory management between processes/threads; and 3) many processes and or threads using shared memory simultaneously, require memory corruption detection and recovery mechanisms to be used to ensure continuation of other threads of execution. Embodiments of the present invention are directed toward addressing these problems.

Figure 1:
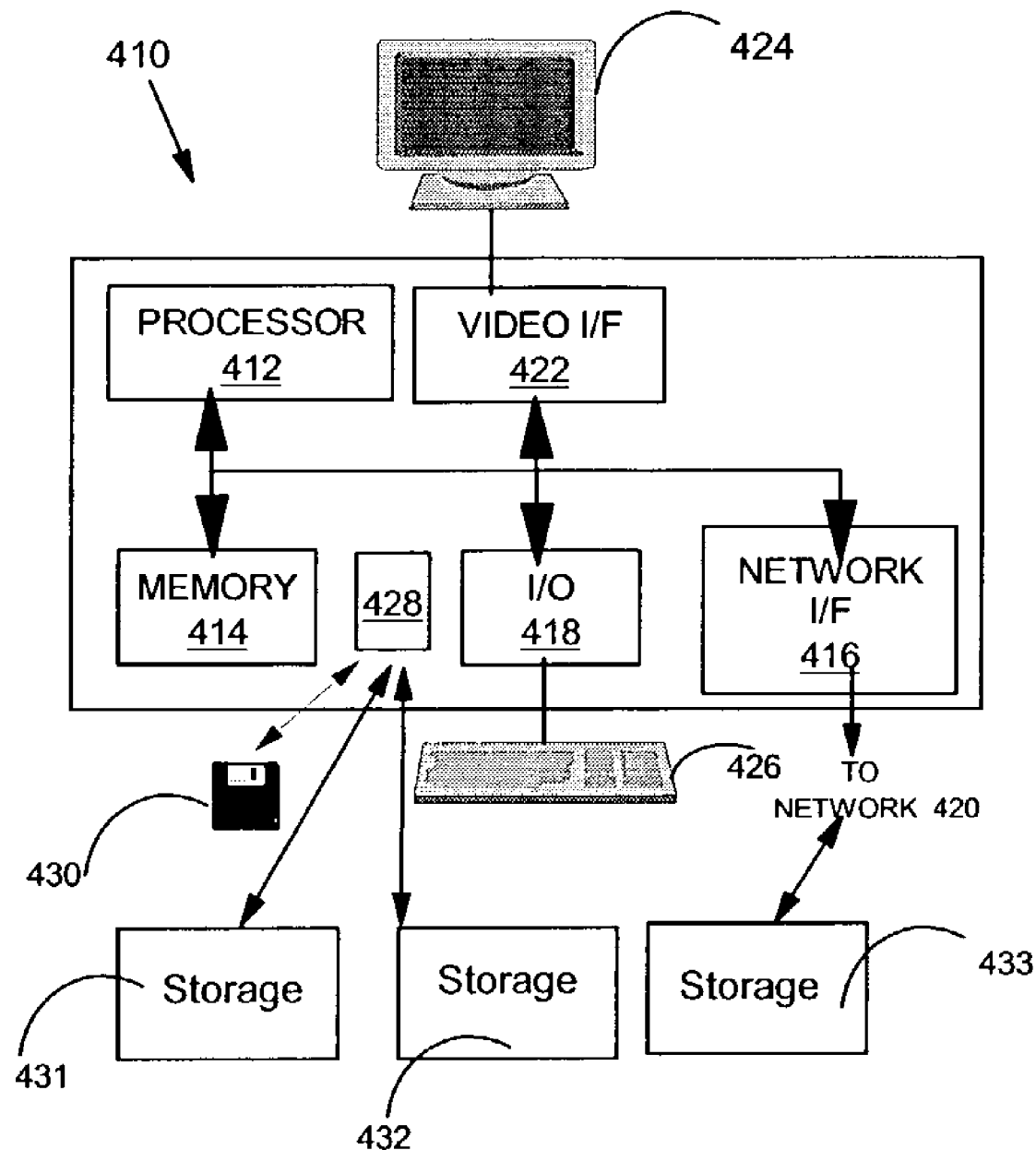
FIG. 1 shows an exemplary system for incorporating an embodiment of the invention.

Simplified preferred hardware architecture of an example computing device 410 is schematically illustrated in FIG. 1. In the illustrated embodiment, device 410 is a conventional network capable device. Device 410 could, for example, be an Intel x86 based computer acting as a Microsoft Windows NT, Apple, or UNIX based server, workstation, personal computer or the like. Example device 410 includes a processor 412, in communication with computer storage memory 414; network interface 416; input output interface 418; and video adapter 422. As well, device 410 may optionally include a display 424 interconnected with adapter 422; input/output devices, such as a keyboard 426 and disk drive 428 and a mouse (not shown) or the like. Processor 412 is typically a conventional central processing unit, and may for example be a microprocessor in the INTEL x86 family. Of course, processor 412 could be any other suitable processor known to those skilled in the art. Computer storage memory 414 includes a suitable combination of random access memory, read-only-memory, and disk storage memory used by device 412 to store and execute software programs adapting device 412 to function in manners exemplary of embodiments of the present invention. Drive 428 is capable of reading and writing data to or from a computer readable medium 432 used to store software and data to be loaded into memory 414. Computer readable medium 432 may be a CD-ROM, diskette, tape, ROM-Cartridge or the like or other large capacity storage. Network interface 426 is any interface suitable to physically link device 410 to network 416. Interface 426 may, for example, be an Ethernet, ATM, ISDN interface or modem that may be used to pass data from and to network 420 or another suitable communications network.

Figure 2:
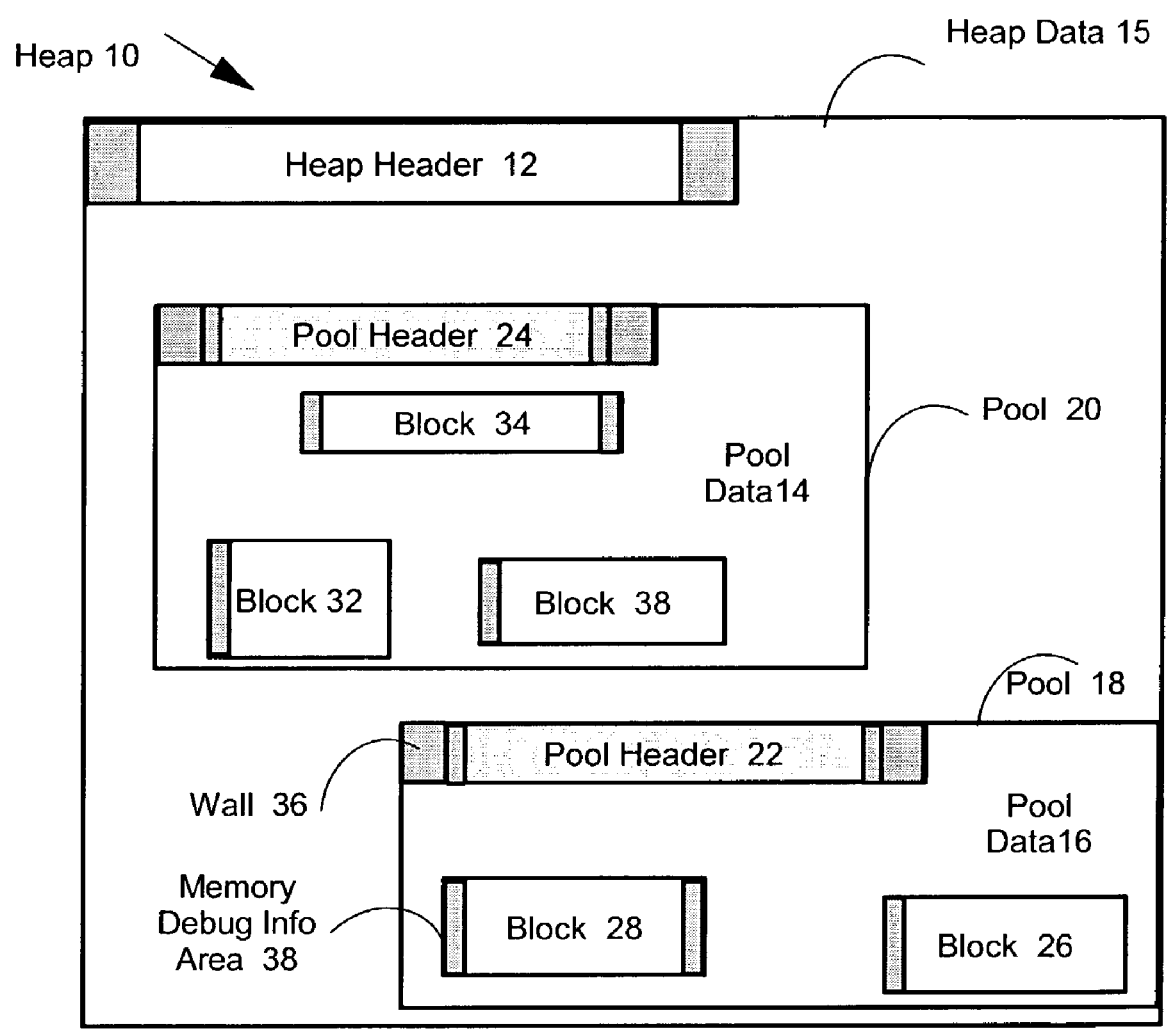
FIG. 2 shows a schematic layout of a memory storage heap incorporating an embodiment of the invention of FIG. 1.

In a preferred embodiment, a memory manager maintains various data structures within the heap or primary allocation of memory. FIG. 2 shows a structure of a storage memory Heap 10 for a given application. Referring to FIG. 2, Heap 10 is divided into two major areas: Heap Header 12 a primary data structure containing first attribute sets describing the primary allocation of memory, containing control heap information, heap properties and data structures, and Heap Data 15 containing large blocks of memory (subheaps) that are allocated and freed upon request. Heap 10 is used to logically group available memory into a set of independent subheaps or secondary allocations of memory, called memory pools, Pool 18 and Pool 20. Similar to a heap, a pool is divided into two major areas: such as Pool Header 22 and Pool Header 24, a secondary data structure containing secondary attribute sets describing the secondary allocation of memory, containing control pool information, pool properties and data structures, and Pool Data 14 and Pool Data 16 containing tertiary allocations of memory or blocks;

Block 26 and Block 28 of Pool 16 and Block 30, Block 32 and Block 34 of Pool 20, which are blocks of memory that are allocated and freed upon request. Blocks further have an associated tertiary data structure containing tertiary attribute sets describing the tertiary allocation of memory. Each pool can have a different size and its own set of properties. Pools are allocated from a heap and used for subsequent memory block suballocations such as Block 26 and Block 28 of Pool 16. A memory block is a block of memory in the storage heap of a requested fixed size. It is typically used to store a program object of some data type. The data areas within blocks are contiguous and non overlapping.

An advantage of using memory pools is that any suballocations made within the pool are not required to be freed individually before freeing the entire pool. This assures that memory that is no longer needed is returned to the heap free memory list for reuse, increasing the availability of usable memory for future allocation requests. Also each pool has a separate lock that significantly reduces lock contention when several processses/threads allocate memory blocks from different pools on computer systems with several CPUs. In addition assigning each thread a separate memory pool can essentially reduce cache sloshing (when the current value of a cache line rapidly migrating from cache to cache resulting in a cache miss and a memory read).

Pools and blocks are allocated and freed using the methods described next. The term chunk (allocation) is used for both pool (secondary allocation of memory) and block (tertiary allocation of memory) to stress that the same context applies to memory pools and blocks.

The defensive approach used in an embodiment of the invention is based on separating control information regarding chunk attributes such as, memory chunk size, its current status (free/in use), links to the next and previous chunk, etc. from memory chunks themselves and putting such control information into a relevant data structure within a protected (by special hidden walls described below) heap or pool header, separating metadata from data. This approach requires efficient methods capable of quickly searching and updating information about the free and allocated memory blocks. A preferred embodiment utilizes a randomized data structure called a skip list which uses extra links in the nodes of a linked list in order to skip portions of a list during a search. Skip lists use probabilistic balancing rather than strictly enforced balancing to provide results with performance comparable to or even better than some balanced tree implementations. For many applications, skip lists are more natural representation than trees, leading to simpler methods and easier implementation. When only one (the lowest) link level is used for all nodes in a list, the skip list becomes a well-known linked list. Additional information about skip lists, may be found in an article entitled "Skip Lists: A Probabilistic Alternative to Balanced Trees" by William Pugh. This article was published in Communications of the Association for Computing Machinery v. 33, No. 6, 1990, pp. 668–676.

An additional safeguard incorporated in an embodiment of the invention is the usage of separate skip lists for free and allocated chunks. Typical memory managers maintain various data structures containing information about free blocks only, making it quite difficult to check allocated blocks for memory leaks and other errors. Having separate lists for free and allocated memory chunks (pools or blocks) and isolating the list control information (by putting the lists of relevant memory chunks into a Heap Header 12 or Pool Header 22 and Pool Header 24 as shown in FIG. 1) from the rest of Heap Data 15 or Pool 14 or Pool 16 space allows management of a heap or pool even if some of the allocated chunks become corrupted. In event of a nonfatal memory error, heap/pool space can still be used for memory requests since skip list data structures for free and allocated chunks remain intact within the respective heap/pool headers. Maintaining separate lists and isolating list control information may be important in long standing networked server and database applications where usually there are several threads of execution and detecting a memory corruption error for one thread should not prevent the execution of other threads. Applications utilizing an embodiment of the present invention may recover from nonfatal memory errors by implementing adequate memory error detection and using application specific recovery actions upon detecting errors. Depending on the desired error response policy, the corrupted memory can be ignored and not used anymore, analyzed for the source of an error, or freed and returned to a memory pool for further reuse by this or some other application process/thread. Various recovery scenarios may be applied depending on the application. For example, in modern RDBMS databases, if a memory corruption has been detected before the final commit for a unit of work (UOW), the database product could in theory perform a rollback of the entire UOW or report the error and continue the execution sequence. A unit of work represents a set of database operations such as table inserts, updates, deletions, etc., which is performed as atomic operation. In the event of memory corruption or an error being detected before the commit operation is finished, the whole UOW has to be redone by rolling back the database to a state before the start of the UOW. Now the UOW can be executed again or an error can be returned to the application which requested the UOW. One or several memory pools/blocks involved may be freed during the rollback and allocated again if the UOW is to be redone.

In a preferred embodiment, memory chunks are allocated from the end of the heap or pool (higher memory address) toward its header which is located (see FIG. 2) at the beginning of the heap or pool (lower memory address). In this scheme, the largest free chunk is usually the one immediately following the header. This allows one to minimize the consequences of a memory overrun type of memory corruption in which memory is usually corrupted in the address space including the current chunk and one or more neighbor chunks located at ascending addresses from the starting address of the current chunk. Although this can not prevent memory corruption, it effects only one memory chunk or a few memory chunks adjacent to the current memory chunk and does not corrupt the control data, containing sizes and offsets of chunks involved, which are kept safe behind the walls in the header. Since control information about free and allocated chunks remains intact in the heap/pool header, this may allow a process or thread to continue its execution sequence involving other memory chunks, ignore, free or even reuse the corrupted memory chunk (depending on the chosen recovery policy) after the detection of a nonfatal memory error.

Figure 3:
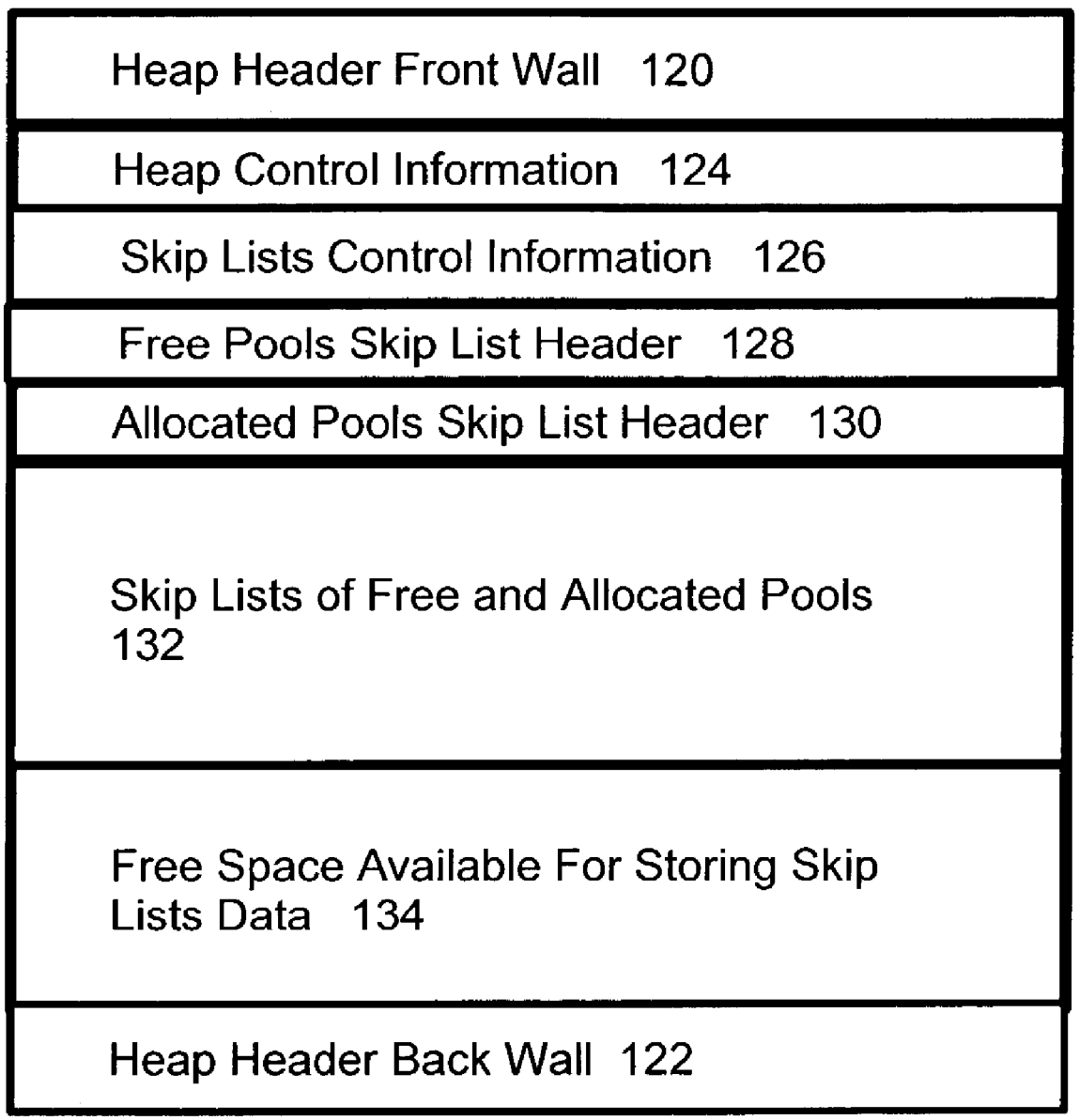
FIG. 3 shows a schematic structure of a storage heap header as may be found in the memory storage heap of FIG. 2.

Referring to FIG. 3 a Heap Header 12 or Pool Header 22 or 24 shown in FIG. 2, containing skip lists data and other control information is protected by using special hidden walls Heap Header Front Wall 120 and Heap Header Back Wall 122 around the header as shown in FIG. 3. Heap Header Front Wall 120 and Heap Header Back Wall 122 correspond to Wall 36 in FIG. 2. Each front and back wall is a read/write/execute-protected page sized memory area which immediately generates a memory protection fault in case of unauthorized access to the area. A signal handler can be used to intercept the above error, notify the process and handle the desired response to the error instead of exiting. Assigning such a signal handler will allow the performance of various actions in response to a detected memory protection fault. For example, the fact that a task has hit the wall(s) around the heap or pool header can be logged, stack trace can be dumped. For additional availability, the protection provided by these hidden walls can be reduced or even turned off for commercial applications, and many other actions can be performed. In addition, the address that caused the memory protection fault can be examined to determine if a memory protection wall was illegally accessed, the error can be logged then dealt with programmatically (by returning an error) without interruption to the other processes or threads that are using the memory management facility. Although it is possible to corrupt a pool header by skipping over the front wall, it is very unlikely since the most probable pool header memory corruption type is one of memory overrun from some bad allocation in the preceding pool. This form of corruption would typically hit one of the walls around the header and generate a memory protection error.

An embodiment of the invention utilizes a technique of immediate coalescing of a freed chunk with its left and/or right neighbor. Information about the allocated and free memory chunks (pools or blocks) is stored in two separate skip lists: allocated chunks are stored in a doubly linked skip list sorted by their offsets and free chunks are stored in a doubly linked skip list sorted by their offsets and sizes. In a preferred embodiment, each node of both skip lists contains, but is not limited to, the following data: user's chunk offset (offset to a memory pool/block from the beginning of a heap that is returned to a process, which has requested an allocation, as an address or as a part of a handle), user's chunk size (size that was originally requested), actual chunk's offset (offset to a memory chunk actually allocated from a heap), actual size of chunk (total size of a memory chunk actually allocated from a heap), node level, and, optionally, some additional data required for memory debug. Additional information may contain the calling function name or function identifier, calling process or thread ID, source code line number, file name, or any other information useful for identifying the source of detected memory corruption.

In a preferred embodiment, allocated memory chunks are ordered by their offsets in ascending order. Offsets rather than addresses are used, since it allows the use of the present memory manager for shared memory management (where each process can have its own address space) without any changes to the methods. Each skip list node contains the NodeLevel+1 links to the next and to the previous node. NodeLevel is the current skip list node level.

In a preferred embodiment, nodes from a list of free chunks are combined into a bi-directional circular doubly linked skip list ordered by both chunk offsets and sizes in ascending order. Each node contains two sets of (NodeLevel+1) multiplied by 2 links where one set of links connects the current node to the corresponding next and previous nodes from the skip list sequence sorted by offset and the other set of links connects the current node to the corresponding next and previous nodes from another sequence of nodes sorted by size. This allows one to coalesce free chunks in constant time just by reconnecting the relevant links in both directions (in address and size ascending order) for each set of links. Having such a bi-directional ordering additionally avoids a problem with managing the same size memory chunks since they are ordered in the skip list by their offsets from a heap/pool header. Note that if NodeLevel=0, skip lists become the usual doubly linked lists. Using separate lists for free and allocated blocks is an important defensive feature of a preferred embodiment since all control information remains intact in the heap header in case one or several allocated chunks are corrupted. A process/thread can therefore either recover (according to the chosen error recovery policy) from a nonfatal error or gracefully exit allowing other processes/threads to continue using the heap.

In a preferred embodiment a best-fit sequential-fit algorithm is used that searches the size-sorted skip list of free chunks from the beginning, and uses the first chunk large enough to satisfy the request. If the chunk found has the same size as the size of the chunk requested (note that requested size is aligned internally on specified boundary value plus hidden attachments can be added with control information when the proper debug mode is specified), it is deleted from a list of free chunks and inserted into the offset-ordered list of allocated chunks. If the chunk found is larger than necessary, it is split and the remainder is put on the free list. The chunk requested is inserted into the offset-ordered list of allocated chunks. All necessary counters and variables containing sizes and other data are updated during the allocation and are protected by the heap/pool latch (all skip list operations are atomic). During insertion, a random number generator is used to calculate a new node level. In a preferred embodiment the following procedure is used for calculating a new node level (the example is in the C language):

for (level=0; (rand( )<RAND_MAX_HALF) && (level<=curlevel) && (level<maxlevel); level++) { }

The level is calculated using the current level value, curlevel, and the number produced by the random generator, rand( ), and is limited from above by the maximum node level allowed, maxlevel. Here, RAND_MAX_HALF=RAND_MAX/2 where RAND_MAX is a constant specifying the maximum value returned by rand( ). In a preferred embodiment, a node level increment is limited by one (if a new level calculated using procedure above is higher than the current one) until it reaches the maxlevel. This choice allows one to properly balance skip list by keeping most node levels at lower values and gradually increasing the maximum node level resulting in accelerated skip list search.

In a preferred embodiment, in order to free a chunk, it is deleted from the skip list of allocated chunks, then an offset to a chunk next to the one requested to be freed is found in the list of offset ordered free chunks, and then a check is performed, following the links in both directions, to determine whether coalescing with either or both neighbors is possible. Having offsets and sizes of the previous and the next chunk allows the manager to immediately determine the possibility of coalescence by a simple addition of corresponding sizes and comparison of the resulting offsets. If both neighboring chunks can be coalesced with the freed chunk, the manager sums all three sizes and inserts the resulting chunk by its offset (at previous chunk offset) into a list of free chunks updating the corresponding link sets and heap control information. If only the previous chunk can be coalesced with the freed one, the manager sums both sizes and inserts the resulting chunk by its offset (at previous chunk offset) into a list of free chunks updating the corresponding link sets and heap control information. If only the next chunk can be coalesced with the freed one, the manager sums both sizes and inserts the resulting chunk by its offset (at the freed chunk offset) into a list of free chunks updating the corresponding link sets and heap control information. If coalescing can not be performed, the manager inserts the freed chunk by its offset into a list of free chunks updating the corresponding link sets and heap control information. Using skip lists allows the manager to significantly reduce time required for performing the search, insert and delete operations. All skip list operations are atomic, and protected by the relevant heap/pool latches.

In a preferred embodiment, minimum pool size equals a memory page size and minimum block size is equal to eight bytes. Pools are aligned on the memory page size and blocks are aligned on double-word (eight-byte) boundaries that minimizing internal fragmentation to an acceptable level. It also makes an allocation procedure portable to different systems. Pools and blocks are allocated from the end of the corresponding heap or pool toward the header (see FIG. 2). In this scheme, the largest free chunk is usually the one immediately following the header.

Since all information about memory allocations and free blocks is kept in a heap header of a fixed size (which depends on the size of a heap requested and maximum skip list node order allowed), an embodiment of the invention also addresses the issue of internal fragmentation of the header that may occur as the result of numerous allocations and deletions of skip list nodes. In a preferred embodiment, space for skip list nodes is allocated sequentially within the predefined skip list area inside the heap/pool header until it is filled completely. The defragmentation procedure starts after the predefined threshold level of internal fragmentation has been reached. Depending on the memory requests, their frequency, and size of a free space left in the heap header, the following defragmentation scenarios are applied: 1) if free fragmented skip list space is larger than some predefined percentage (for example, 5%) of the total skip list space, MaxSLSpace, and the counter of defragmentations performed, SLDefragCounter, is less than its specified maximum value, the defragmentation is performed in-place. This procedure involves reading skip lists data and creating new skip lists by copying the data read back into lists just created. This can be done by using the same node level random distribution as was obtained from the skip list data or by generating a new random distribution of skip list node levels, which will rebalance the lists and may additionally improve the locality of reference; 2) if free skip list space is less than some predefined percentage (for example 5%) of the total skip list space or the counter of defragmentations has reached its maximum value, it is increased in size (e.g., by the size of the original skip list space) using memory from the free chunk immediately following the heap/pool header (usually it is the largest free chunk). Then data about the free and allocated chunks stored in the header is read and copied into new skip lists created in this extended header area. New node offset values stored in hidden attachments (described later) to the allocated chunks are updated as well using the data from the list of allocated chunks. This procedure is repeated as many times as required while free space within heap/pool header is available; 3) if free fragmented skip list space is much larger than the header space currently used for skip lists data, the size of the header can be reduced to a size large enough to contain the skip lists data currently in use. This may happen as the result of multiple node deletions after freeing associated allocated chunks. The header size can be reduced to the original header size or to some multiple of it depending on the available space for storing header and skip lists data. The heap memory manager estimates the amount of free space available and decreases the size of the header as specified by the chosen criteria (e.g., free space should be>60% of the total skip list space). Defragmentation in-place is performed on this reduced header area, and the size of the free chunk immediately following the header is increased by the freed amount. New node offset values stored in hidden attachments (described below) to the allocated chunks are updated as well using the data from the list of allocated chunks. This process is repeated as many times as required while skip list space shrinks to its original size. The last two scenarios involve moving the protective wall which ends the heap/pool header to a new position inside the heap/pool. The header data structures described below contain all necessary information about changes in the heap/pool header space needed for the heap memory manager. The data in these structures are correspondingly updated during each defragmentation. As soon as the relevant heap/pool lock is released all other processes/threads start to use the updated header information and may need to remove protection from the old protective wall and protect the new wall.

In a preferred embodiment, before allocating any memory pools or blocks, the heap memory manager is called to create and initialize a memory heap of specified size (usually it is of the size of a process storage heap or shared memory segment). It calculates heap header size, sets initial values for all heap control data (specific heap header data structures are described below), creates skip list headers and inserts a free pool of the size of total heap space minus heap header size into a skip list of free memory pools. Now the memory heap is ready for handling various memory requests. The memory manager returns to the requesting process a heap handle which in a preferred embodiment contains, but is not limited to, the following information: 1) starting address of a memory heap or shared memory segment; 2) a flag containing a set of heap options for each bit that is set on and 3) a heap identifier. This heap handle is used for all memory requests involving memory pools including freeing the heap.

After receiving a request for allocating a memory pool, the memory manager performs all necessary size alignments and adjustments related to the specified memory debug mode (they are described below), allocates a new memory pool from available free heap space, creates and initializes a pool header (specific pool header data structures are described below), updates heap header data using a heap handle provided, and inserts a free block of the size of total pool space minus pool header size and memory debug data size into a skip list of free memory blocks. The heap memory manager returns to the requesting process a pool handle which in a preferred embodiment contains, but is not limited to, the following information: 1) starting address of a memory heap or shared memory segment; 2) a flag containing a set of pool options for each bit that is set on, 3) a pool identifier which in a preferred embodiment is the unique user's pool offset value, for example, an offset from the heap starting address to the beginning of a pool header without walls and any memory debug attachments, and 4) actual pool offset from the heap starting address. This pool handle is used for all memory requests involving memory blocks including freeing the pool.

When a request has been made for a memory block, the memory manager returns an address of an allocated memory block. This is a user's address, for example the address of a memory area of the requested size. In a preferred embodiment, the actual size of the allocated block can be larger than the size requested since the memory block is aligned internally to double-word boundary (or some larger value if specified), and also some hidden (front and/or back) memory debug attachments may be added, the sizes of which depend on debug mode used. Additionally, allocated memory can be initialized at the time of the request before return to the requester. When a request to free a memory block, no longer needed, has been received by the heap memory manager, the heap memory manager uses the block address and pool handle provided by the caller to release the memory into the pool for further use. Freed memory can also be cleaned and postfilled at the time of the request before returning to the pool.

Figure 4:
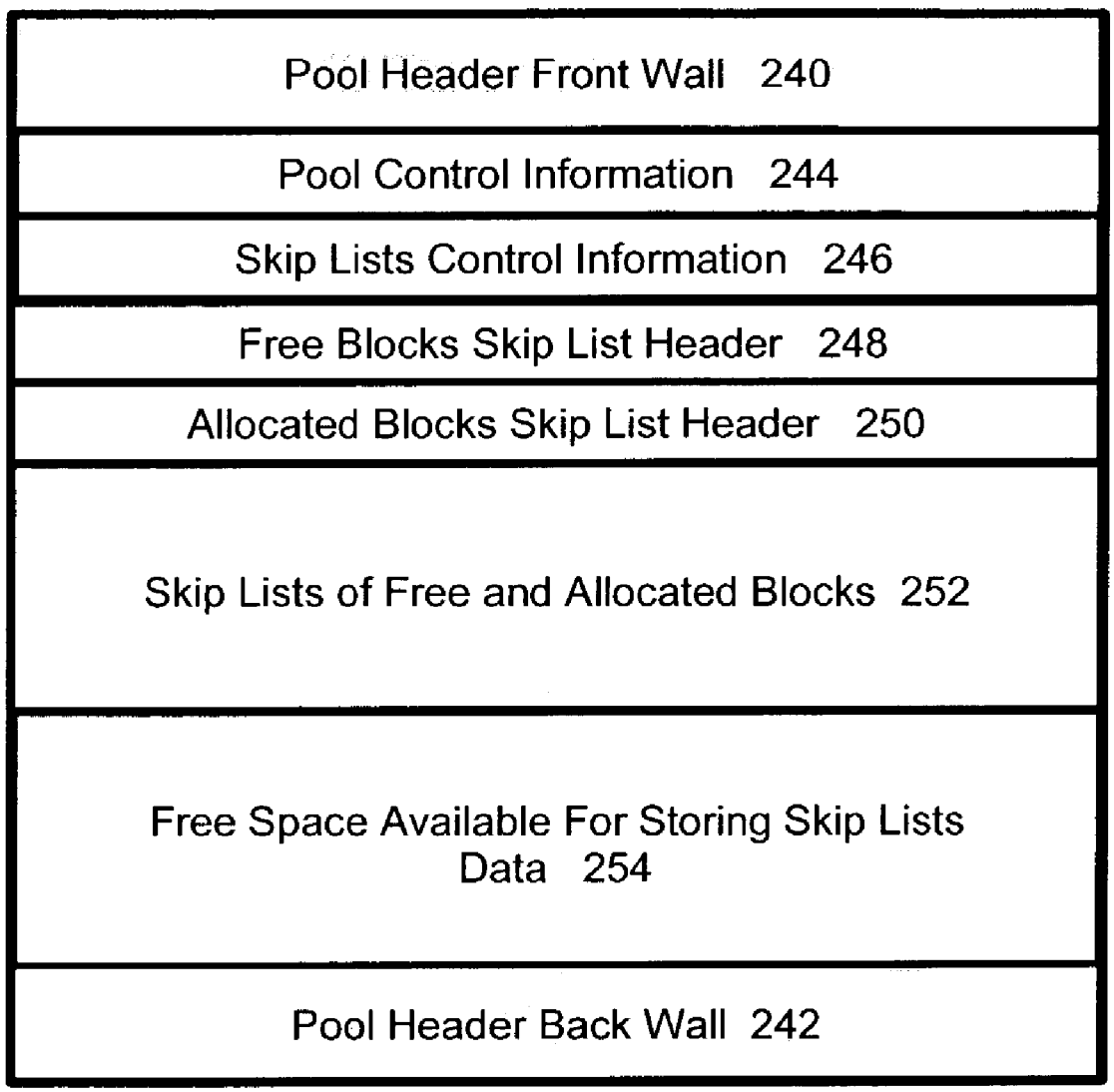
FIG. 4 shows a schematic structure of a memory pool header as may be found in Wall 51 of Pool Header 22 of FIG. 2.
Figure 5:
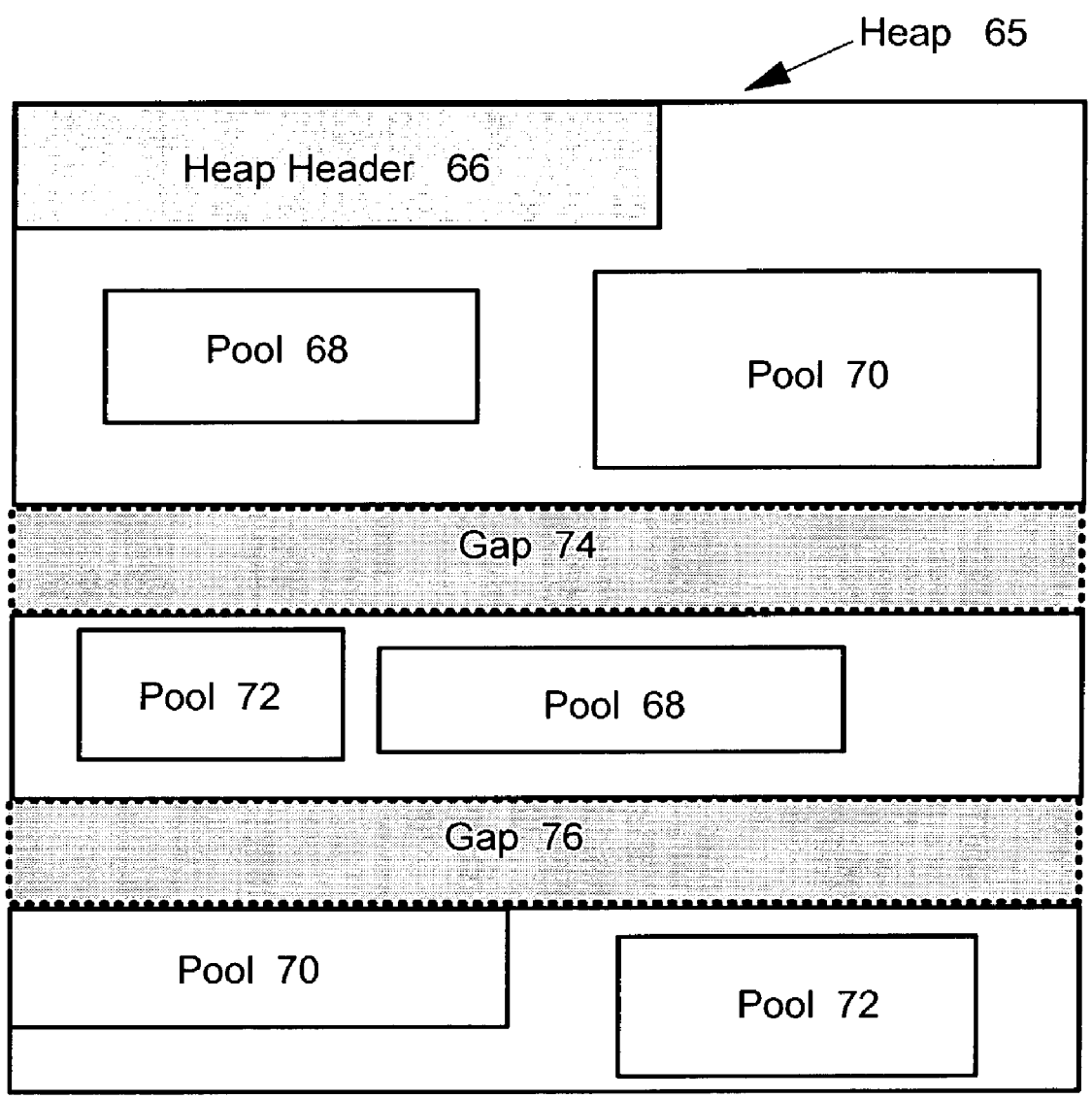
FIG. 5 shows a schematic memory heap layout possible for a storage heap as in FIG. 2, after two memory storage heap size increases.

As the result of multiple allocations, free heap space can be reduced to an amount insufficient for new pool allocations. After receiving notification from an application that there is not enough space left in a storage heap to satisfy the memory request, the heap memory manager requests from the system (if such option is supported and enabled) an additional chunk of memory, increases the heap size and satisfies the request. In a preferred embodiment, after obtaining additional memory from the system, the heap memory manager first determines if the new space is continuous with the original heap. If the space is continuous the manager increases the size of the heap. When the space is not continuous, the heap memory manager inserts a new node into a linked list of heap memory gaps along with the gap offset and size and updates the total heap size. The heap memory manager then saves into private memory all necessary heap control information and the skip list's data extracted from lists of free and allocated pools. The heap memory manager next creates a new heap header for the increased storage heap, copies the saved heap control information with all necessary data modifications into the control heap header area, and then creates new skip list headers and copies the saved skip list data into the relevant skip lists for free and allocated pools. A handle to a resized memory heap is returned to the requesting process. Similarly, a memory storage heap used by the memory manager can be reduced in size, if desired, using the same method, provided there is enough free space to reduce its size without destroying any data inside. A list of allocated pools can be scanned for offsets and sizes in order to see if the heap has enough free space to accommodate the requested reduction. Pools can be resized as well using the same technique. Referring to FIG. 5 is shown a schematic structure of a memory storage Heap 65 after two increases of the heap size. The original heap contained two pools, Pool 68 and Pool 70. After the first memory request, an additional space obtained from the system has been added to Heap 65 over Gap 74. The heap header information has been updated and the gap offset and size have been inserted into a linked list of gaps maintained by the heap manager within the heap header. Space for Pool 68 has been increased as well using new storage heap space after Gap 74. Skip list data in the heap header have been correspondingly modified. A new Pool 72 has been allocated and added to a list of pools. The second memory request from the system by the heap memory manager increased the heap space again. New space has been added after the second Gap 76. The heap header information has been updated and a new node with Gap 76 information has been inserted into the linked list of gaps. The sizes of Pool 70 and Pool 72 have been increased and extended over the gaps in order to satisfy increased memory requests. Pool headers have been updated appropriately. The resulting schematic heap structure after the two heap storage size increases performed by the heap memory manager is shown in FIG. 4. If the holder of memory occupied by a gap decides to free it, the memory manager may allocate the memory that used to be the gap. In this case, the memory manager will try to coalesce this memory with adjacent heap/pool space. After obtaining the memory requested, the manager scans a list of gaps from the header to determine whether coalescing is possible by comparing the gap offsets with the memory made available by the system. If there is one match, the gap is reduced by the amount of memory obtained or, if both gap boundaries match, the gap disappears completely and a contiguous region over this heap/pool area is created. The list of memory gaps is updated appropriately. Note that the operating system usually adds a small hidden header to the allocated memory which should be accounted for when comparing gap offsets with memory made available by the system. To increase chances for coalescing and better memory reuse, the heap memory manager, after receiving a request for additional heap/pool space, may first scan the list of gaps to find the closest gap size large enough to accommodate the memory request.

The memory manager described in a preferred embodiment is intended to be of general application and to be capable of being implemented in different manners by those skilled in the art while retaining the functionality of a preferred embodiment. The defensive features of the heap memory manager of a preferred embodiment follows.

Consider first the structure of a heap header (primary allocation data structure) in which many different header layouts can be used. The header layout of a preferred embodiment is shown in FIG. 3. The header itself is placed between a Heap Header Front Wall 120 and a Heap Header Back Wall 122 memory page sized hidden walls. The heap header of a preferred embodiment contains sets of attributes organized as follows (examples are in the C language):

1) Behind and adjacent to Heap Header Front Wall 120 is Heap Control Information 124, consisting of two data structures. The first structure, HeapHeader_t, contains the general information about the heap, namely:

```
typedef struct HeapHeader_t {
    SMVar_t    isInitialized;
    SMVar_t    HeapFlags;
    SMVar_t    HeapID;
    SMVar_t    ReferenceCount;
    SMVar_t    TotalSpace;
    SMVar_t    FreeSpace;
    SMVar_t    AllocSpace;
    SMVar_t    LLGapInfo;
    SMVar_t    MaxNumMemAlloc;
    SMVar_t    MemAlignPoolSize;
    Latch_t    HeapLatch;
}HeapHeader_t;
```

In the above definition, SMVar_t represents a variable type defined for implementation of memory manager. The details of the variable type may vary between different implementations of the manager. As will be apparent from the description of a preferred embodiment, the memory manager described is intended to be of general application and to be capable of being implemented in different manners while retaining the functionality of a preferred embodiment.

The isInitialized variable is a flag indicating whether the storage heap is initialized or not Variable HeapFlags defines a set of heap flags and options for each bit that is set on. HeapID is a storage heap unique identifier. ReferenceCount is a counter of connections to a heap. TotalSpace stores the total size of the heap. FreeSpace stores the size of a free space available. AllocSize stores the size of the allocated heap space. LLGapInfo stores the offset to a linked list of memory gaps between the original heap and additional space returned to the heap memory manager by the system on its requests when additional memory is requested by an application. If the LLGapInfo value is zero, the linked list is empty and is not used by the memory manager. Non zero offset value points to the beginning of the linked list, each node of which contains a gap offset, its size and a link to the next node. The last node in the list contains zero in the next link field. MaxNumMemAlloc is the maximum number of memory allocations. This number is used for internal heap memory management to estimate the amount of space required for heap management control information and also for handling memory fragmentations. This number depends on the size of the heap and should be estimated based on this size. The actual number of memory allocations can eventually become larger than the MaxNumMemAlloc value. Variable MemAlignPoolSize stores the minimal pool size. All memory allocations will be aligned to this value internally regardless of specific sizes requested for memory pools. Minimal alignment pool size allowed is a memory page size which is the default value as well. HeapLatch is the data structure used for exclusive locking of the control information during memory operations. This locking mechanism may be implemented in different manners by those skilled in the art.

The second structure, HeapDebugInfo_t contains memory debug information, namely:

```
typedef struct HeapDebugInfo_t {
    SMVar_t   DebugMode;
    SMVar_t   DebugFlags;
    SMVar_t   PostAllocFlag;
    SMVar_t   FrontMDIAHits;
    SMVar_t   BackMDIAHits;
    SMVar_t   DuplicateFrees;
    SMVar_t   BadFrees;
    Latch_t   DebugLatch;
}HeapDebugInfo_t;
```

DebugMode is a variable specifying a desired memory debug mode such as none, idle, light, full, extended. MemDebugFlags defines a set of memory debug flags and options for each bit that is set on. It can be used to specify prefill (fill of memory during allocation) and postfill (fill of memory during freeing) of memory, to track statistics for memory problems, to define types of actions when an error is found, such as, return an error and abort; analyze the error, report and exit; return to the state before all allocations from the pool corrupted, free the pool and continue with new allocations; return to the state before all allocations from the pool corrupted, free allocated memory and exit; return to the state before all allocations from the pool corrupted, free the pool, allocate a new pool and continue the task; ignore corrupted allocation and continue; free corrupted allocation and continue; free corrupted allocation and exit; free corrupted allocation, check its right and left neighbors for corruption, send a signal to other applications which are using the memory, and exit; check the whole list of allocations for memory leaks and corruption and report if error is found. PostAllocFlag is set to non-zero value after the first allocation. FrontMDIAHits stores the number of hits of the front memory debug information area (MDIA) attached to the allocation. MDIA structure is discussed in details below. BackMDIAHits stores the number of hits of the back memory debug info area attached to the allocation. DuplicateFrees stores a counter of allocation duplicate frees. BadFrees stores a counter of bad frees detected. DebugLatch is the data structure used for latching the memory debug data when request for read or update is issued. DebugLatch can be implemented in different manners by those skilled in the art.

2) Skip Lists Control Information 126 is located after and adjacent to Heap Control Information 120 containing information common for both skip lists. It consists of the following structure

```
typedef struct HeapSListInfo_t {
    SMVar_t   MaxNumSLLevels;
    SMVar_t   MaxSLSpace;
    SMVar_t   AllocSLSpace;
    SMVar_t   FreeSLSpaceBoundary;
    SMVar_t   NumMemAlloc;
    SMVar_t   NumFreeMemPools;
    SMVar_t   SLDefragCounter;
} HeapSListInfo_t;
```

The MaxNumSLLevels is a variable containing the maximum number of skip list levels allowed. MaxSLSpace stores the maximum size of skip list space reserved in a heap header (sum of sizes of areas 124, 126, 128, 130, 132, and 134 of FIG. 3). AllocSLSpace stores the size of the occupied space by skip list data (sum of sizes of areas 124, 126, 128, 130, and 132 of FIG. 3 (minus freed node sizes) FreeSLSpaceBoundary stores the offset from the beginning of a heap to the beginning of Free Space Available for Storing Skip Lists Data 134 for storing skip lists data. NumMemAlloc is a total number of successful memory allocations. NumFreeMemPools stores total number of free memory pools. SLDefragCounter is a counter of skip list space successive defragmentations. If the predetermined counter threshold is reached, the size of Free Space Available for Storing Skip Lists Data 134 is evaluated and the header space may then be compacted in place, increased or decreased depending on free header space available (header defragmentation has been discussed above).

3) In a preferred embodiment, after and adjacent to Skip Lists Control Information 126 is doubly linked Free Pools Skip List Header 128. It contains the MaxFreeSLLevel variable that stores the maximum skip list node level for a list of free pools and the head and tail node for the list. Each node has data fields and the MaxNumSLLevels multiplied by 4 links. After initialization all head links point into the corresponding tail ones and vice versa. Free pools are inserted into the list as needed. Space for new nodes is taken from Free Space Available for Storing Skip Lists Data 134. After each insertion, the FreeSLSpaceBoundary is moved toward the end of heap header space by the size of the inserted node that is added to Skip Lists of Free and Allocated Pools 132.

4) In a preferred embodiment, after and adjacent to Free Pools Skip List Header 128 is located Allocated Pools Skip List Header 130. It contains the MaxAllocSLLevel variable that stores the maximum skip list node level for a list of allocated pools and the head and tail node for the list. Each node has data fields and the MaxNumSLLevels multiplied by 2 links to the next and previous node. After initialization all head links point into the corresponding tail links and vice versa. Allocated pools are inserted into the list as needed using the standard skip list insertion algorithms. Space for new nodes is taken from Free Space Available for Storing Skip Lists Data 134. After allocation, the FreeSLSpaceBoundary is moved toward the end of heap header space by the size of inserted node that is added to Skip Lists of Free and Allocated Pools 132.

5) In a preferred embodiment, after and adjacent to Allocated Pools Skip List Header 130 is located Skip Lists of Free and Allocated Pools 132. This space contains skip list nodes for both free and allocated pools. All allocations are sequential and use space from Free Space Available for Storing Skip Lists Data 134 while free space is available.

6) In a preferred embodiment, after and adjacent to Skip Lists of Free and Allocated Pools 132 is located Free Space Available for Storing Skip Lists Data 134. The FreeSLSpaceBoundary variable contains offset to the beginning of this space and moves toward the end of a heap header with each skip list node allocation. Space allocated for the node is added to the area Skip Lists of Free and Allocated Pools 132. After reaching the end of free space, the defragmentation process described above starts, compacts the heap header in place or increases/decreases its size as required and resets the FreeSLSpaceBoundary value and the heap control information. After compacting the header, the heap memory manager continues to fulfill memory requests.

The structure of a pool header (secondary data structure) as used in a preferred embodiment is shown in FIG. 4. The pool header itself is placed between Pool Header Front Wall 240 and Pool Header Back Wall 242 memory page sized hidden walls described above. The pool header of a preferred embodiment contains sets of attributes organized as follows:

1) Behind Pool Header Front Wall 240 is located Pool Control Information 244. This information consists of two data structures. The first structure, PoolHeader_t, contains the general information about the heap, namely:

```
typedef struct PoolHeader_t {
    SMVar_t    isInitialized;
    SMVar_t    PoolFlags;
    SMVar_t    PoolID;
    SMVar_t    HeapID;
    SMVar_t    ReferenceCount;
    SMVar_t    TotalSpace;
    SMVar_t    FreeSpace;
    SMVar_t    AllocSpace;
    SMVar_t    LLGapInfo;
    SMVar_t    MaxNumMemAlloc;
    SMVar_t    MemAlignBlockSize;
    Latch_t    PoolLatch;
}PoolHeader_t;
```

The isInitialized variable is a flag indicating whether memory pool is initialized or not.

Variable PoolFlags defines a set of pool flags and options for each bit that is set on. PoolID is a pool identifier which in a preferred embodiment is the unique user's pool offset value, i.e., offset from the heap starting address to the beginning of a pool header without walls and any memory debug attachments. HeapID is a storage heap identifier of the heap to which the pool belongs. ReferenceCount is a counter of connections to a pool. TotalSpace stores the total size of the pool. FreeSpace stores the size of a free space available. AllocSize stores the size of the allocated pool space. LLGapInfo stores the offset to a linked list of memory gaps between the original pool and additional space returned to the heap memory manager by the system on its requests when additional memory is requested by an application. If the LLGapInfo value is zero, the linked list is empty and is not used by the memory manager. Non zero offset value points to the beginning of the linked list each node of which contains a gap offset, its size and a link to the next node. MaxNumMemAlloc is the maximum number of memory allocations. This number is used for internal heap memory management namely to estimate the amount of space required for pool control information and also for handling memory fragmentations. The actual number of memory allocations can eventually become larger than the MaxNumMemAlloc value. This number depends on the size of the pool and should be estimated based on this size. Variable MemAlignBlockSize stores the minimal memory block size. All memory allocations will be aligned to this value internally regardless of specific sizes requested for memory blocks. Minimal alignment block size allowed is a double-word size (eight bytes) which is the default value as well. PoolLatch is the data structure used for exclusive locking the control information during memory operations. It can be implemented in different manners by those skilled in the art.

The second structure, PoolDebugInfo_t contains the memory debug information and has exactly the same structure as the HeapDebugInfo_t structure described above.

2) In a preferred embodiment, after and adjacent to Pool Control Information 244 is located Skip Lists Control Information 246 common for both skip lists. It consists of the following structure

```
typedef struct PoolSListInfo_t {
    SMVar_t    MaxNumSLLevels;
    SMVar_t    MaxSLSpace;
    SMVar_t    AllocSLSpace;
    SMVar_t    FreeSLSpaceBoundary;
    SMVar_t    NumMemAlloc;
    SMVar_t    NumFreeMemBlocks;
    SMVar_t    SLDefragCounter;
} PoolSListInfo_t;
```

The MaxNumSLLevels is a variable containing the maximum number of skip list levels allowed. MaxSLSpace stores the maximum size of skip list space reserved in a pool header (sum of sizes of areas 244, 246, 248, 250, 252 and 254 of FIG. 4). AllocSLSpace stores the size of the occupied space by skip list data (sum of sizes of areas 244, 246, 248, 250, and 252 of FIG. 3 (minus freed node sizes)). FreeSLSpaceBoundary stores the offset from the beginning of a heap to the beginning of Free Space Available for Storing Skip Lists Data 254. NumMemAlloc is a total number of successful memory allocations. NumFreeMemBlocks stores total number of free memory blocks. SLDefragCounter is a counter of skip list space successive defragmentations. If the predetermined counter threshold is reached, the size of Free Space Available for Storing Skip Lists Data 254 is evaluated and the header space may then be compacted in place, increased or decreased depending on free header space available (header defragmentation has been discussed above).

3) In a preferred embodiment, after and adjacent to Skip Lists Control Information 246 is located a header for doubly linked Free Blocks Skip List Header 248. It contains the MaxFreeSLLevel variable that stores the maximum skip list node level for a list of free blocks and the head and tail node for the list. Each node has data fields and the MaxNumSLLevels multiplied by 4 links. After initialization all head links point into the corresponding tail ones and vice versa. Free blocks are inserted into the list as needed. Space for new nodes is taken from Free Space Available for Storing Skip Lists Data 254. After each insertion, the FreeSLSpaceBoundary is moved toward the end of pool header space by the size of the inserted node that is added to Skip Lists of Free and Allocated Blocks 252.

4) In a preferred embodiment, after and adjacent to Free Blocks Skip Lists Header 248 is located Allocated Blocks Skip List Header 250. It contains the MaxAllocSLLevel variable that stores the maximum skip list node level for a list of allocated blocks and the head and tail node for the list. Each node has data fields and the MaxNumSLLevels multiplied by 2 links to the next and previous node. After initialization all head links point into the corresponding tail links and vice versa. Allocated blocks are inserted into the list as needed using the standard skip list insertion algorithms. Space for new nodes is taken from Free Space Available for Storing Skip Lists Data 254. After allocation, the FreeSLSpaceBoundary is moved toward the end of pool header space by the size of inserted node that is added to Skip Lists of Free and Allocated Blocks 252.

5) In a preferred embodiment, after and adjacent to Allocated Blocks Skip List Header 250 is located Skip Lists of Free and Allocated Blocks 252. This space contains skip list nodes for both free and allocated blocks. All allocations are sequential and use space from Free Space Available for Storing Skip Lists Data 254 while free space is available.

6) In a preferred embodiment, after and adjacent to Skip Lists of Free and Allocated Blocks 252 is located Free Space Available for Storing Skip Lists Data 254. The FreeSLSpaceBoundary variable contains offset to the beginning of this space and moves toward the end of a pool header with each skip list node allocation. Space allocated for the node is added to Skip Lists of Free and Allocated Blocks 252. After reaching the end of free space, the defragmentation process described above starts, compacts the pool header in place or increases/decreases its size as required and resets the FreeSLSpaceBoundary value and the pool control information. After compacting the header, the heap memory manager continues to fulfill memory requests.

Figure 6A:
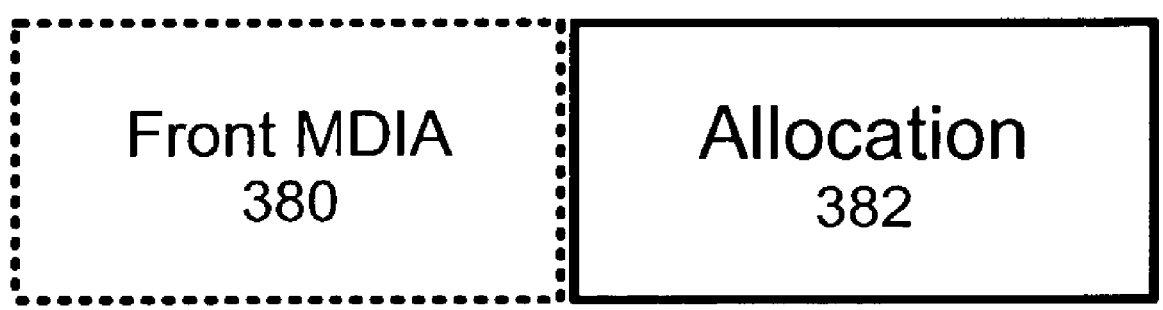
FIG. 6a shows a schematic structure of possible memory allocation with hidden front Memory Debug Information Area (MDIA) attachments as may be found in Memory Debug Info Area 38 of FIG. 2.
Figure 6B:
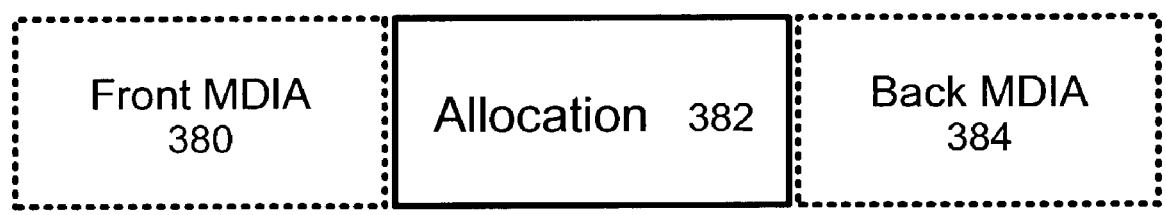
FIG. 6b shows a schematic structure of possible memory allocation with hidden front and back Memory Debug Information Area (MDIA) attachments as may be found in Memory Debug Info Area 38 of FIG. 2.
Figure 6C:
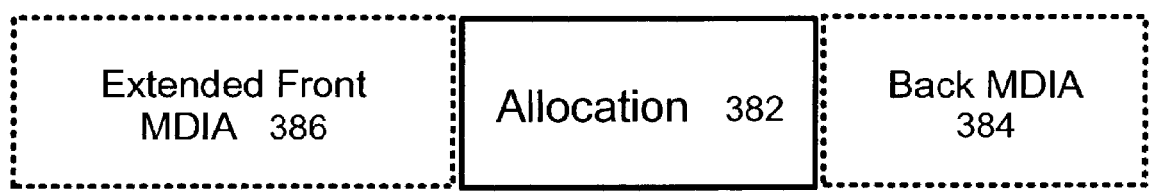
FIG. 6c shows a schematic structure of possible memory allocation with hidden front extended and rear Memory Debug Information Area (MDIA) attachments as may be found in Memory Debug Info Area 38 of FIG. 2.

For an additional layer of memory protection and better error detection, a preferred embodiment provides a hidden front attachment (Memory Debug Information Area or MDIA as shown in FIGS. 6a, 6b, and 6c and described in more detail to follow, also referred to as a tertiary data structure) attached to each memory chunk and an optional back MDIA attachment can be added as well. These attachments contain sets of attributes describing the tertiary allocation namely, debugging and control information (chunk's checksum, debug mode, debug options, etc.) and a special signature area that is used for checking whether memory has been corrupted or not. The validity of the allocated memory can then be verified on each or some specified memory operation involving the chunk or when memory debugging is set. In a preferred embodiment, the heap memory manager has several levels of data protection that can be turned on or off on the fly. The simplest check is performed by comparing a signature area inside a MDIA with some well-known value. A more detailed check is performed by calculating a checksum and comparing it with the one stored in the front (and back) MDIA. Several levels of memory corruption verification can be selected from a list of available options. When a memory corruption is detected, in addition to or instead of issuing an error/warning message, the corresponding chunk can be ignored, freed or reused without aborting the process execution sequence depending on the chosen recovery policy. The next and/or previous allocated chunk can be examined to detect a possible memory overflow type of error. A process/thread then has a chance to recover, provide a warning about the problem or quietly exit. The uncorrupted, freed or recovered part of the heap can still be used by other threads in multithreaded environment.

The heap memory manager of a preferred embodiment has the ability to turn debugging features on or off on the fly at all times. This ability allows a long-standing application process to enable the desired memory debugging level without interruption of the task. For example, if there is suspicion of a memory leak in the current process, detection of memory corruption can be enabled on the fly and the list of either all or only corrupted allocations can be returned for further examination together with other useful information (such as source file name, code line number, caller function name or identifier, etc.) which can also be stored in the front MDIA. The desired level of debugging information is stored in the options variable in the front MDIA and can be changed on the fly as well. The basic memory corruption errors that can be detected by the present heap memory manager of an embodiment of the invention, using checksums and MDIA signature areas include, but are not limited to the following errors: 1) memory overflow corruption; 2) memory underflow corruption; 3) uninitialized read; 4) bad free; 5) duplicate free; 6) use after free; 7) stray corruption (using checksums). In many practical situations reliable detection of memory leaks and corruption is more important than additional overhead of calculating a checksum for each memory operation or some chosen ones (checksum verifications can be dynamically turned off when they are not required). For memory pools checksums can be calculated using pool header data only which can reduce the checksum calculation time overhead dramatically.

Basically, the checksum feature is an add-on feature that could be used by integrity sensitive code. It does not need to be used by any code in order for the rest of an embodiment of the invention to work. It can however detect memory corruptions quickly and accurately if used. Without such a feature, there is no way to know for sure whether memory has been corrupted by a rogue thread or process.

Referring to FIGS. 6a, 6b, and 6c in a preferred embodiment, each Allocation 382 has hidden 24 byte Front MDIA 380, as in FIG. 6a, and an optional Back MDIA 384 as in FIG. 6b, containing debugging information about the chunk and a special signature area which is used for verifying whether memory has been corrupted. The 24 byte Front MDIA 380 is vital to allow memory debug features to be turned on/off on the fly. Each Front MDIA 380 consists of two 64 bit and two 32 bit fields, namely: 1) 64 bit checksum, CheckSum, calculated using the chunk data and options field. (any suitable method for calculating a checksum that is sufficiently fast can be used by those skilled in the art); 2) 64 bit variable, NodeOffset, containing the offset to a skip list node storing the memory chunk info. If one knows the offset, a valid information (requested and actually allocated chunk size, user's and actual offset to the chunk, debug options, calling function identifier, line number, file name, etc.) about the chunk stored in the relevant node of the list of allocated chunks kept in a heap/pool header can be easily accessed and extracted. The next and/or previous chunk(s) can be examined for memory corruption as well. Moreover, this information can be used for freeing the corrupted chunk(s) if so specified by the error recovery protocol. The NodeOffset is extremely important and useful for memory debugging. If a memory corruption has been detected for some memory chunk, its NodeOffset (if uncorrupted) will allow to find not only the information about the chunk but also about its neighbors (using the next/previous node links in the list of allocated chunks) which can be examined for memory corruption as well. If the NodeOffset value has been damaged/corrupted in both front and back MDIA of the chunk under investigation, the NodeOffset of its closest uncorrupted neighbor chunk can be used to find a valid information about the corrupted one from the doubly linked list of allocated chunks which are ordered by offsets. Moreover, access to the memory management APIs can be locked and the allocated memory blocks from the heap as well as other memory regions (such as process or thread stacks) can be scanned for a specific range of addresses that contained the possible addresses of the corrupted area. The range of addresses is a guess at which potential pointer may have caused the corruption and can be obtained by examining the number and size of the corrupted area. For example, if the back MDIA is corrupted for only one block but the front MDIA is still intact, the range of addresses should start from the beginning address of the block until the address of the back MDIA for the corrupted block. A pointer in this range may have been the key to the corruption. The purpose of the scan is to find which allocated block (if any) contains the bad pointer which may have corrupted the block. If the corrupted block is under control of and embodiment of the invention, the function (and potentially the file name, area of the function and/or line number) which allocated the block containing the bad pointer, can be identified. All allocations within this range can be checked (by following the relevant links from the ordered doubly linked list of allocated chunks) and processes/threads using the allocations inside the range can be notified about the corruption; 3) the reserved 32 bit area, MemSignature, contained a well-known signature (eye catcher) which is used to verify the validity of memory. Signatures can be the same or different for the Front MDIA 380 and Back MDIA 384 and may differ for specific debug modes; 4) the DebugMode variable that defines 32 debug options for each bit that is set on. Space for the debug options is present in the MDIA at all times and can be changed dynamically. Checksums and/or the reserved area can be turned on/off on the fly depending on the desired level of debug information. Moreover, turning some options on can expand the size of front MDIAs, of FIG. 6c creating Extended Front MDIA 386, which may now include additional debugging information about memory chunks and source files containing the relevant memory function calls.

In a preferred embodiment, debug options include but are not limited to the following modes: idle memory debug, light memory debug (without back MDIA), full memory debug (default), full memory debug with checksum verification, extended memory debug, and extended memory debug with checksum verification. When the idle debug mode is set, memory is not checked for corruption. This mode can be easily transformed into light memory debug mode with or without (when only signature is checked) checksum verification. Full debug mode involves both Front MDIA 380 and Back MDIA 384 attachments used with or without checksum verification and recalculation. Extended debug mode allows one to add more detailed debug information which may be useful in debugging memory corruptions. In a preferred embodiment, in addition to standard 24 byte MDIA Extended Front MDIA 386 may contain but is not limited to the following fields: source file name, file line number, calling function name or unique identifier, size of additional front and/or back signature fields that may be added to Extended Front MDIA 386 and Back MDIA 384 for more strict memory checking. Useful information required for memory debug can be added as an attachment to a memory allocation. FIGS. 6a, 6b, and 6c show a schematic layout of Allocation 382 with various hidden MDIA attachments. FIG. 6a shows Allocation 382 with Front MDIA 380 attachment only. Such a layout may be chosen when idle or light memory debug mode is used. FIG. 6b shows Allocation 382 with Front MDIA 380 and Back MDIA 384 attachments. The configuration of FIG. 6b is used when full memory debug mode with or without checksum verification is chosen. In FIG. 6c, Allocation 382 with Extended Front MDIA 386 and full Back MDIA 384 attachments is shown. This configuration is used when extended memory debug mode with or without checksum verification is chosen. Back MDIA may be extended as well to create a block similar to the Extended Front MDIA 386, but is not shown.

Each memory operation is first checked for specified debug options. If the 'checksum' bit is set, the checksum stored in the front MDIA (and also in the back MDIA, if specified) is verified, then the required memory operation is performed (if checksum is intact), the checksum is recalculated, and is copied back into the MDIA. If the checksum option is not set, the requested memory operation is performed without verifying (and recalculating) the checksum. Due to the performance overhead, checksum should be used wisely and only for data that should never be corrupted. By default the checksums would be off for most cases. For integrity sensitive memory that is not used often or that is not performance critical, checksums can be used for each read and write of memory. Checksum processing may be limited to frees, or performed on all read/writes. The latter although quite expensive will guarantee that data has not been damaged by a rogue process or thread.

A signature area should always be checked when the light, full or extended debug mode is set. It is an inexpensive check which will allows detection of most common types of memory corruption. Typically there is little chance that a memory overrun directed from in front of the MDIA could corrupt the MDIA and avoid detection. If the debug options settings were damaged so would the checksum and the eye catcher (signature field). If a part of the MDIA were damaged the checksum would also be damaged. If the entire MDIA was damaged the eye catcher would also be damaged.

Allocated memory can also be prefilled on allocation and/or postfilled after freeing using some well-known values. Since all allocations should be aligned internally on the double word boundary for blocks and memory page size for pools the difference between the requested size and an actually allocated one can also be filled with some well-known pattern. In addition to the mandatory signature and optional checksum check when debugging is on, memory can be checked also for the above well known patterns when corresponding debug options are enabled.

Having a separate list of allocated memory pools/blocks stored in the heap/pool header allows checking for memory leaks before exiting an application process by scanning the list of allocations. In a preferred embodiment, a special debug option is used during the allocation procedure to specify exactly how a memory block is to be freed: individually (the relevant bit in debug options variable is not set) or when the whole pool to which the block belongs will be freed (the relevant bit is set on). In a preferred embodiment, a special function is used for checking a list of allocated pools and blocks. It is typically called by an application before exit (or return) after freeing memory used for performing some completed task. First the special function determines if option above is set for each memory block from a list of allocated blocks. All blocks for which this option is set are skipped since they will be freed in conjunction with the pool to which they belong to. If the resulting list of allocated blocks scanned is not empty, there is a memory leak (since all memory allocations in a list are supposed to be freed when the function is called except for memory blocks marked to be freed with the pool to which they belong). A list of allocated pools can be scanned as well for memory leaks after completion of a task involving the whole heap. Thus, the memory leak(s) detected can be examined using the debug information in a heap/pool header. Information related to memory allocations involved in the leak (user and actual offsets, user and actual sizes, calling function name or function identifier, source file name, code line number, etc.) can be easily accessed directly from the list, which then may be used to free the allocations causing the leak or to debug the source of the problem. Memory can also be checked periodically for corruption and leaks (not only at the end of a task) and compared with expected data to monitor the memory status and availability of long running applications like databases and networked servers.

Figure 7:
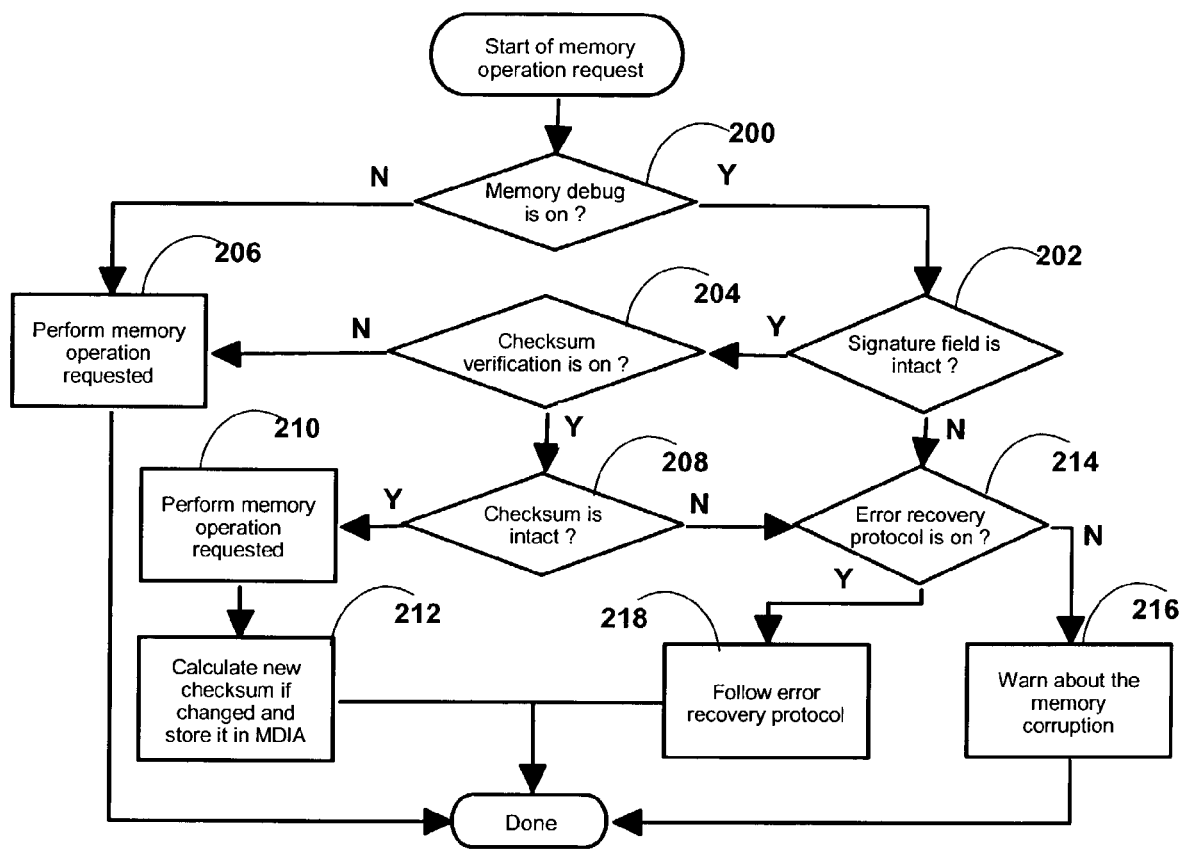
FIG. 7 is a flow diagram of a program requested memory operation (read/write/free) using attached debug information of a preferred embodiment.

FIG. 7 shows a detailed flow diagram of a method used by a preferred embodiment to perform a basic memory operation (read, write, free, etc.) using attached debug information at the request of a requesting program. During each memory allocation debug options, eye catcher (well-known signature), and offset to the relevant skip list node are stored in the MDIA attachment(s). Memory is properly aligned and prefilled by a well-known value if specified. If checksum verification is enabled as well, then a checksum of allocation data is calculated and stored into MDIA attachment(s) to the allocation. A requested operation such as read/write/free/examine a memory chunk is passed to a heap manager. The process begins with operation 200 in which the heap memory manager determines which debug options are enabled for the current allocation. If memory debug is not enabled, the heap memory manager performs requested memory operation 206. If debug is on, the memory manager determines which MDIA attachments will be used and what other options are defined. During operation 202, the memory manager locates the signature field and determines if the eye catcher is intact. If the eye catcher is corrupted, the heap memory manager proceeds to operation 214 during which error recovery protocol enablement is determined. If error recovery protocol was not enabled the heap manager issues a error message during operation 216 and then exits. If error recovery protocol has been enabled, the heap manager proceeds to operation 218 wherein the specific actions provided by the error recovery protocol for that application performed. There can be several error recovery protocols depending on the type of a memory corruption detected and options settings. Numerous actions may be available in response to an error, including outputting debug information, examining memory for more corruptions, performing memory cleanup, rollback up to some starting point, and many others. If the eye catcher is intact, the heap memory manager determines during operation 204 whether checksum verification is enabled. If checksum verification is not enabled, the heap memory manager performs the requested memory operation during operation 206 and finishes the task. When checksum verification is enabled, the memory manager then verifies during operation 208 whether checksum is intact. If the checksum is not intact, the memory manager proceeds to operation 214 as described above. If the checksum is intact, the heap memory manager performs the requested memory operation during operation 210. If the data was changed during operation 210, a new checksum is calculated (or updated depending on the checksum algorithm chosen) and stored 212 in the relevant MDIA attachment(s). If debug options for performing additional checks during freeing/checking memory have been defined, such memory checks can be performed before operation 204 or after operation 212. Memory can also be checked directly for corruption using a skip list of allocated chunks and a set of debug options defined for each chunk. In this case operations 206, 210, and 212 may be omitted. A preferred embodiment defines a set of memory functions for each memory operation. By specifying the desired debug level various memory checks can be turned on or off. For example, an application may turn off checksum calculation and comparison for read operations when speed is essential or even in addition turn off the verification of the reserved signature field for maximum speed and efficiency. In a preferred embodiment, the memory management API includes the following functions: memcisheap (to create and initialize the memory storage heap), memallocpool (to allocate and initialize a memory pool), memallocblk (to allocate a memory block), memassign (to assign a value), memwrite (to copy data of a given size into specified area), memread (to read from specified area of a given size), memcheck (to check the memory using options specified), memlist (to return a list of allocated memory blocks/pools), memctrl (to dynamically change memory debug options), memfreeblk (to free a memory block), memfreepool (to free a memory pool), and memfreesheap (to free the memory storage heap). Each memory operation can be performed with or without memory checking depending on options specified. For example, the following memory errors can be detected depending on the chosen checksum policy: memory block/pool overflow, memory block/pool underflow, uninitialized read, bad free, duplicate free, use after free, and stray corruption (using checksums). Upon detection detecting one of these errors, a process/thread can perform an action from a specified set depending on the recovery policy chosen and options set: exit with error message, examine and print memory corruption information and exit, issue a warning and continue, free the chunk and exit/continue, etc.

The above set of memory management functions can be implemented in different manners by those skilled in the art using the defensive heap memory management described in a preferred embodiment.

Although the invention has been described with reference to illustrative embodiments, it is to be understood that the invention is not limited to these precise embodiments, and that various changes and modifications may be effected therein by one skilled in the art. All such changes and modifications are intended to be encompassed in the appended claims.

The embodiments of the invention in which an exclusive property or privilege is claimed are defined as follows:

1. A data structure in a computer memory for memory management in a data processing system comprising:
   at least one memory block;
   memory debug information associated with said memory block a primary allocation of memory;
   a primary data structure associated with and referenced by said primary allocation of memory, said primary data structure containing a plurality of first attribute sets describing said primary allocation of memory;
   a secondary allocation of memory associated with and referenced by said primary allocation of memory: a secondary data structure associated with and referring to said secondary allocation of memory, said secondary data structure containing a plurality of second attribute sets describing said secondary allocation of memory; and
   a tertiary allocation of memory associated with and referenced by said secondary allocation of memory: a tertiary data structure associated with and referring to said tertiary allocation of memory said tertiary data structure containing a plurality of tertiary attribute sets describing said tertiary allocation of memory.

2. The data structure of claim 1, wherein said memory debug information is selected from a group comprising;
a node offset;
a signature; and
debugging options indicators associated with said memory block.

3. The data structure of claim 1, wherein said primary data structure contains control information of at least one set selected from a group of first attribute sets comprising:
heap control information;
a free pools skip list;
an allocated pools skip list;
skip lists of free and allocated pools; and
free space available for storing skip lists data.

4. The data structure of claim 3, wherein said primary data structure further comprising:
an at least one of a front wall and a back wall, wherein said front wall and said back wall protecting said control information; and
a plurality of information areas adjacent to said at least one of a front wall and back wall, wherein each information area of said plurality of information areas contains one set selected from said group of first attribute sets.

5. The data structure of claim 1, wherein said secondary data structure contains control information of at least one set selected from a group of second attribute sets comprising:
pool control information;
skip lists control information;
a free blocks skip list header;
an allocated blocks skip list header;
skip lists of free and allocated blocks; and
free space available for storing skip lists data.

6. The data structure of claim 5 wherein said secondary data structure further comprising:
an at least one of a front wall and a back wall; and
a plurality of information areas adjacent to said front wall and back wall, wherein each information area of said plurality of information areas contains at least one set selected from said group of second attribute sets.

7. The data structure of claim 1, wherein said tertiary data structure contains control information of at least one set selected from a group of tertiary attribute sets comprising:
a debugging information associated with said tertiary allocation;
a node offset;
a signature; and
debugging options indicators associated with said tertiary allocation.

8. The data structure of claim 7 wherein said tertiary data structure further comprising:
an at least one of a front wall and a back wall; and
a plurality of information areas adjacent to said front wall and back wall, wherein each information area of said plurality of information areas contains at least one set selected from said group of tertiary attribute sets.

9. The data structure of claim 1, wherein said primary, secondary and tertiary data structures are embedded within said primary, secondary and tertiary allocations of memory respectively.

10. A method for allocating a data structure in a computer memory for use in a data processing system, said method, comprising:

allocating at least one memory block; and creating memory debug information associated with said memory block;
allocating a primary allocation of memory;
allocating a primary data structure associated with and referenced by said primary allocation of memory, said primary data structure containing a plurality of first attribute sets describing said primary allocation of memory;
allocating a secondary allocation of memory associated with and referenced by said primary allocation of memory: allocating a secondary data structure associated with and referring to said secondary allocation of memory, said secondary data structure containing a plurality of second attribute sets describing said secondary allocation of memory; allocating a tertiary allocation of memory associated with and referenced by said secondary allocation of memory; and
allocating a tertiary data structure associated with and referring to said tertiary allocation of memory said tertiary data structure containing a plurality of tertiary attribute sets describing said tertiary allocation of memory.

11. The method of claim 10, further comprising:
selectively modifying a size of at least one of said primary allocation of memory and said secondary allocation of memory.

12. A data processing system for implementing a data structure in a computer memory, the data processing system comprising:
means for allocating at least one memory block; and means for creating memory debug information associated with said memory block;
means for allocating a primary allocation of memory;
means for allocating a primary data structure associated with and referenced by said primary allocation of memory, said primary data structure containing a plurality of first attribute sets describing said primary allocation of memory;
means for allocating a secondary allocation of memory associated with and referenced by said primary allocation of memory: means for allocating a secondary data structure associated with and referring to said secondary allocation of memory, said secondary data structure containing a plurality of second attribute sets describing said secondary allocation of memory; and
means for allocating a tertiary allocation of memory associated with and referenced by said secondary allocation of memory: a tertiary data structure associated with and referring to said tertiary allocation of memory said tertiary data structure containing a plurality of tertiary attribute sets describing said tertiary allocation of memory.

13. The data processing system of claim 12, further comprising:
means for selectively modifying a size of at least one of said primary allocation of memory and said secondary allocation of memory.

14. The data processing system of claim 12, further comprising:
means for selectively initiating memory debug; means for selectively indicating a memory debug level;
means for determining debugging conditions indicated by debug options indicators in said tertiary data structure, wherein performing said means for determining may be made selectively;

means for selectively modifying said debug options indicators; and means for selectively initiating collecting of memory statistics.

15. The data processing system of claim 12, further comprising:

means for receiving a request to perform a memory operation; and means for determining debugging conditions indicated in said tertiary data structure; means responsive to said debugging conditions, for performing at least one of: performing said memory request; following an error recovery protocol; and warning of a memory corruption.

16. The data processing system of claim 12, wherein said primary data structure contains control information of at least one set selected from a group of first attribute sets comprising:

heap control information;

a free pools skip list;

an allocated pools skip list;

skip lists of free and allocated pools; and free space available for storing skip lists data.

17. The data processing system of claim 16, wherein said primary data structure further comprising:

an at least one of a front wall and a back wall, wherein said front wall and said back wall protecting said control information; and a plurality of information areas adjacent to said at least one of a front wall and back wall, wherein each information area of said plurality of information areas contains one set selected from said group of first attribute sets.

18. The data processing system of claim 12, wherein said secondary data structure contains control information of at least one set selected from a group of second attribute sets comprising:

pool control information;

skip lists control information;

a free blocks skip list header;

an allocated blocks skip list header;

skip lists of free and allocated blocks; and free space available for storing skip lists data.

19. The data processing system of claim 18, wherein said secondary data structure further comprising: an at least one of a front wall and a back wall; and a plurality of information areas adjacent to said front wall and back wall, wherein each information area of said plurality of information areas contains at least one set selected from said group of second attribute sets.

20. The data processing system of claim 12, wherein said tertiary data structure contains control information of at least one set selected from a group of tertiary attribute sets comprising:

a debugging information associated with said tertiary allocation;

a node offset;

a signature; and debugging options indicators associated with said tertiary allocation.

21. The data processing system of claim 20, wherein said tertiary data structure further comprising:

an at least one of a front wall and a back wall; and a plurality of information areas adjacent to said front wall and back wall, wherein each information area of said plurality of information areas contains at least one set selected from said group of tertiary attribute sets.

22. The data processing system of claim 12, wherein said primary, secondary and tertiary data structures are embedded within said primary, secondary and tertiary allocations of memory respectively.

23. A computer program product having a computer-useable medium including a computer-readable program, which when executed on a computer causes the computer to perform a method comprising:

allocating at least one memory block; and creating memory debug information associated with said memory block;

allocating a primary allocation of memory;

allocating a primary data structure associated with and referenced by said primary allocation of memory, said primary data structure containing a plurality of first attribute sets describing said primary allocation of memory;

allocating a secondary allocation of memory associated with and referenced by said primary allocation of memory; allocating a secondary data structure associated with and referring to said secondary allocation of memory, said secondary data structure containing a plurality of second attribute sets describing said secondary allocation of memory; allocating a tertiary allocation of memory associated with and referenced by said secondary allocation of memory; and allocating a tertiary data structure associated with and referring to said tertiary allocation of memory said tertiary data structure containing a plurality of tertiary attribute sets describing said tertiary allocation of memory.

* * * * *